US010114758B2

(12) United States Patent
Duncan et al.

(10) Patent No.: US 10,114,758 B2
(45) Date of Patent: Oct. 30, 2018

(54) TECHNIQUES FOR SUPPORTING FOR DEMAND PAGING

(71) Applicant: NVIDIA CORPORATION, Santa Clara, CA (US)

(72) Inventors: Samuel H. Duncan, Arlington, MA (US); Jerome F. Duluk, Jr., Palo Alto, CA (US); Jonathon Stuart Ramsay Evans, Santa Clara, CA (US); James Leroy Deming, Madison, AL (US)

(73) Assignee: NVIDIA CORPORATION, Santa Clara, CA (US)

( * ) Notice: Subject to any disclaimer, the term of this patent is extended or adjusted under 35 U.S.C. 154(b) by 449 days.

(21) Appl. No.: 14/026,806

(22) Filed: Sep. 13, 2013

(65) Prior Publication Data

US 2015/0082001 A1  Mar. 19, 2015

(51) Int. Cl.
*G06F 12/10* (2016.01)
*G06F 12/1009* (2016.01)

(52) U.S. Cl.
CPC ............................... *G06F 12/1009* (2013.01)

(58) Field of Classification Search
None
See application file for complete search history.

(56) References Cited

U.S. PATENT DOCUMENTS 5,983,329 A * 11/1999 Thaler ................... G06F 12/126
   711/145
6,073,226 A *  6/2000 Cutshall ............. G06F 12/1009
   711/202
6,249,851 B1 *  6/2001 Richardson ......... G06F 12/0859
   711/141
7,136,979 B2 * 11/2006 Fuente .................... G06F 13/28
   711/103
7,447,856 B2 * 11/2008 Fuente .................... G06F 13/28
   711/103

(Continued)

OTHER PUBLICATIONS

MPEP(2144.04)(VI)(B), Nov. 2015, R-07.2015, pp. 1-4.*

(Continued)

*Primary Examiner* — Christopher D Birkhimer
(74) *Attorney, Agent, or Firm* — Artegis Law Group, LLP

(57) ABSTRACT

One embodiment of the present invention includes techniques to support demand paging across a processing unit. Before a host unit transmits a command to an engine that does not tolerate page faults, the host unit ensures that the virtual memory addresses associated with the command are appropriately mapped to physical memory addresses. In particular, if the virtual memory addresses are not appropriately mapped, then the processing unit performs actions to map the virtual memory address to appropriate locations in physical memory. Further, the processing unit ensures that the access permissions required for successful execution of the command are established. Because the virtual memory address mappings associated with the command are valid when the engine receives the command, the engine does not encounter page faults upon executing the command. Consequently, in contrast to prior-art techniques, the engine supports demand paging regardless of whether the engine is involved in remedying page faults.

26 Claims, 5 Drawing Sheets

(56) References Cited

U.S. PATENT DOCUMENTS

| | | | | |
|---|---|---|---|---|
| 7,506,095 B2* | 3/2009 | Otte | ............... | G06F 9/44573 |
| | | | | 711/6 |
| 7,617,381 B2* | 11/2009 | Kim | ............... | G06F 12/10 |
| | | | | 711/206 |
| 7,680,987 B1* | 3/2010 | Clark | ............... | G06F 12/08 |
| | | | | 711/147 |
| 7,793,062 B2* | 9/2010 | Fuente | ............... | G06F 13/28 |
| | | | | 711/103 |
| 7,827,374 B2* | 11/2010 | Cholleti | ............... | G06F 12/0223 |
| | | | | 711/170 |
| 8,041,876 B1* | 10/2011 | Anvin | ............... | G06F 12/1036 |
| | | | | 711/163 |
| 8,166,276 B2* | 4/2012 | Serebrin | ............... | G06F 12/0253 |
| | | | | 711/203 |
| 8,219,779 B2* | 7/2012 | Adams | ............... | G06F 12/1009 |
| | | | | 711/206 |
| 8,341,329 B2* | 12/2012 | Anvin | ............... | G06F 12/1036 |
| | | | | 711/207 |
| 9,043,559 B2* | 5/2015 | Radovic | ............... | G06F 12/16 |
| | | | | 711/141 |
| 2005/0027958 A1* | 2/2005 | Fuente | ............... | G06F 13/28 |
| | | | | 711/165 |
| 2007/0101085 A1* | 5/2007 | Fuente | ............... | G06F 13/28 |
| | | | | 711/165 |
| 2008/0256318 A1* | 10/2008 | Fuente | ............... | G06F 13/28 |
| | | | | 711/165 |
| 2010/0162038 A1* | 6/2010 | Hulbert | ............... | G06F 11/073 |
| | | | | 714/5.11 |
| 2010/0223447 A1* | 9/2010 | Serebrin | ............... | G06F 12/0253 |
| | | | | 712/225 |
| 2011/0099088 A1* | 4/2011 | Berrios | ............... | G06Q 30/06 |
| | | | | 705/26.81 |
| 2012/0017032 A1* | 1/2012 | Anvin | ............... | G06F 12/1036 |
| | | | | 711/6 |
| 2012/0159039 A1* | 6/2012 | Kegel | ............... | G06F 12/1009 |
| | | | | 711/6 |
| 2012/0185667 A1* | 7/2012 | Gandhi | ............... | G06F 12/1009 |
| | | | | 711/203 |
| 2012/0226850 A1* | 9/2012 | Nakanishi | ............... | G06F 12/1009 |
| | | | | 711/102 |
| 2012/0246201 A1* | 9/2012 | Starr | ............... | G06F 17/30079 |
| | | | | 707/809 |
| 2012/0246381 A1* | 9/2012 | Kegel | ............... | G06F 12/109 |
| | | | | 711/6 |
| 2014/0115283 A1* | 4/2014 | Radovic | ............... | G06F 12/16 |
| | | | | 711/162 |
| 2014/0267334 A1* | 9/2014 | Duluk, Jr. | ............... | G06F 11/0751 |
| | | | | 345/543 |
| 2014/0281110 A1* | 9/2014 | Duluk, Jr. | ............... | G06F 13/404 |
| | | | | 710/313 |
| 2014/0281255 A1* | 9/2014 | Duluk, Jr. | ............... | G06F 11/073 |
| | | | | 711/133 |
| 2014/0281256 A1* | 9/2014 | Duluk, Jr. | ............... | G06F 11/073 |
| | | | | 711/133 |
| 2014/0281263 A1* | 9/2014 | Deming | ............... | G06F 12/08 |
| | | | | 711/135 |
| 2014/0281264 A1* | 9/2014 | Duluk, Jr. | ............... | G06F 12/08 |
| | | | | 711/135 |
| 2014/0281296 A1* | 9/2014 | Duluk, Jr. | ............... | G06F 11/073 |
| | | | | 711/159 |
| 2014/0281297 A1* | 9/2014 | Duluk, Jr. | ............... | G06F 12/1009 |
| | | | | 711/159 |
| 2014/0281299 A1* | 9/2014 | Duluk, Jr. | ............... | G06F 12/122 |
| | | | | 711/160 |
| 2014/0281323 A1* | 9/2014 | Duluk, Jr. | ............... | G06F 12/1009 |
| | | | | 711/165 |
| 2014/0281324 A1* | 9/2014 | Duluk, Jr. | ............... | G06F 12/08 |
| | | | | 711/165 |
| 2014/0281356 A1* | 9/2014 | Buschardt | ............... | G06F 12/1009 |
| | | | | 711/206 |
| 2014/0281357 A1* | 9/2014 | Duluk, Jr. | ............... | G06F 11/073 |
| | | | | 711/206 |
| 2014/0281358 A1* | 9/2014 | Duluk, Jr. | ............... | G06F 11/073 |
| | | | | 711/206 |
| 2014/0281364 A1* | 9/2014 | Buschardt | ............... | G06F 12/1009 |
| | | | | 711/207 |

OTHER PUBLICATIONS

Webopedia, "Interrupt", Aug. 6, 2002, pp. 1-2, https://web.archive.org/web/20020806203437/http://www.webopedia.com/TERM/I/interrupt.html.*

Webopedia, "Queue", Aug. 10, 2002, pp. 1-2, https://web.archive.org/web/20020810034508/http://www.webopedia.com/TERM/Q/queue.html.*

Webopedia, "Demand Paging", Oct. 8, 2002, pp. 1-1, https://web.archive.org/web/20021018112236/http://www.webopedia.com/TERM/D/demand_paging.html.*

Anonymous, "Page Replacement Algorithm", Feb. 20, 2011, pp. 1-2, http://pagereplacementalgorithm.blogspot.com/2011/02/anticipatory-paging.html.*

Webopedia, "Demand Paging", Oct. 18, 2002, pp. 1-1, https://web.archive.org/web/20021018112236/http://www.webopedia.com/TERM/D/demand_paging.html.*

Joydip Kanjilal, "Virtual Memory and Demand Paging", Oct. 26, 2006, pp. 1-4, https://web.archive.org/web/20061026101512/http://aspalliance.com/articleVieweraspx?aId=969&pId=-1.*

Deitel & Associates, "Chapter 11—Virtual Memory Management", 2004, pp. 1-23, https://web.archive.org/web/20060902101432/http://courses.cs.vt.edu/~cs3204/spring2004/Notes/OS3e_11.pdf.*

* cited by examiner

TECHNIQUES FOR SUPPORTING FOR DEMAND PAGING

BACKGROUND OF THE INVENTION

Field of the Invention

The present invention generally relates to computer science and, more specifically, to techniques for supporting demand paging.

Description of the Related Art

A typical computer system includes a central processing unit (CPU) and one or more parallel processing units (PPUs). Some advanced computer systems implement a unified virtual memory architecture common to both the CPU and the PPUs. Among other things, the architecture enables the CPU and the PPUs to access a physical memory location using a common (e.g., the same) virtual memory address, regardless of whether the physical memory location is within system memory or memory local to the PPU.

In operation, a process executing on a processing unit (e.g., either the CPU or the PPU) accesses data stored in physical memory via a virtual memory address. To execute the memory access, the memory management unit (MMU) associated with the processing unit attempts to translate the virtual memory address to a physical memory address. If the translation is successful, then the processing unit uses the physical address to access the data stored in a physical memory. However, in some cases, the memory access request may not be successful, such as when the page table associated with the processing unit does not include the necessary address mapping or when the processing unit does not have permission to access the physical memory with the type of memory access requested. In general, if an MMU is unable to translate a virtual memory address to an appropriate physical memory address, then the MMU generates a page fault.

With some processing units, unsuccessful memory access requests can be fatal, meaning that the process executing on the processing unit is not able to execute as intended when a page fault occurs. "Demand paging" addresses this issue. With demand paging, if a process is unable to initially access data via a virtual memory address, then steps are taken to remedy the page fault and the process executes as intended.

In one approach to supporting demand paging, a unit within the computer system that performs an unsuccessful memory access stalls while the computer system responds to the page fault. After the computer system maps the virtual memory address to an appropriate location in physical memory or provides the necessary access permission, the faulting unit retries the memory access. For example, suppose that a compute engine included in the PPU were to attempt to access data via a virtual memory address, and the PPU MMU was unable to translate the virtual memory address to a physical memory address. In such a scenario, the PPU MMU would generate a page fault and the compute engine would stall. Fault-handling mechanisms within the computer system would remedy the page fault and, subsequently, the compute engine would perform the memory access successfully.

One drawback of the above approach is that stalling faulting units risks stalling the units required to remedy the page fault. Notably, if a unit required to remedy a page fault stalls, then the page fault may not be properly remedied. For instance, if a copy engine were to encounter a page fault, then the copy engine would be unable to perform operations to remedy the page fault, such as page table update operations. Consequently, stalling faulting units enables demand paging only for those units that are not involved in remedying page faults.

As the foregoing illustrates, what is needed in the art is a more effective approach to supporting demand paging.

SUMMARY OF THE INVENTION

One embodiment of the present invention sets forth a method for supporting demand paging. The method includes receiving a request for an engine within a processing subsystem to perform an operation that is associated with one or more virtual memory addresses; prior to transmitting the request to the engine, establishing that the processing subsystem includes a memory mapping for each of the one or more virtual memory addresses; and transmitting the request to the engine for processing.

One advantage of the disclosed approach is that a processing subsystem may effectively support demand paging across all engines included in the processing subsystem. By validating virtual memory address mappings associated with an operation before a particular engine receives the operation, these techniques ensure that the engine does not encounter page faults upon executing the operation and, therefore, does not stall. Consequently, these techniques enable engines that are involved in remedying page faults to support demand paging.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
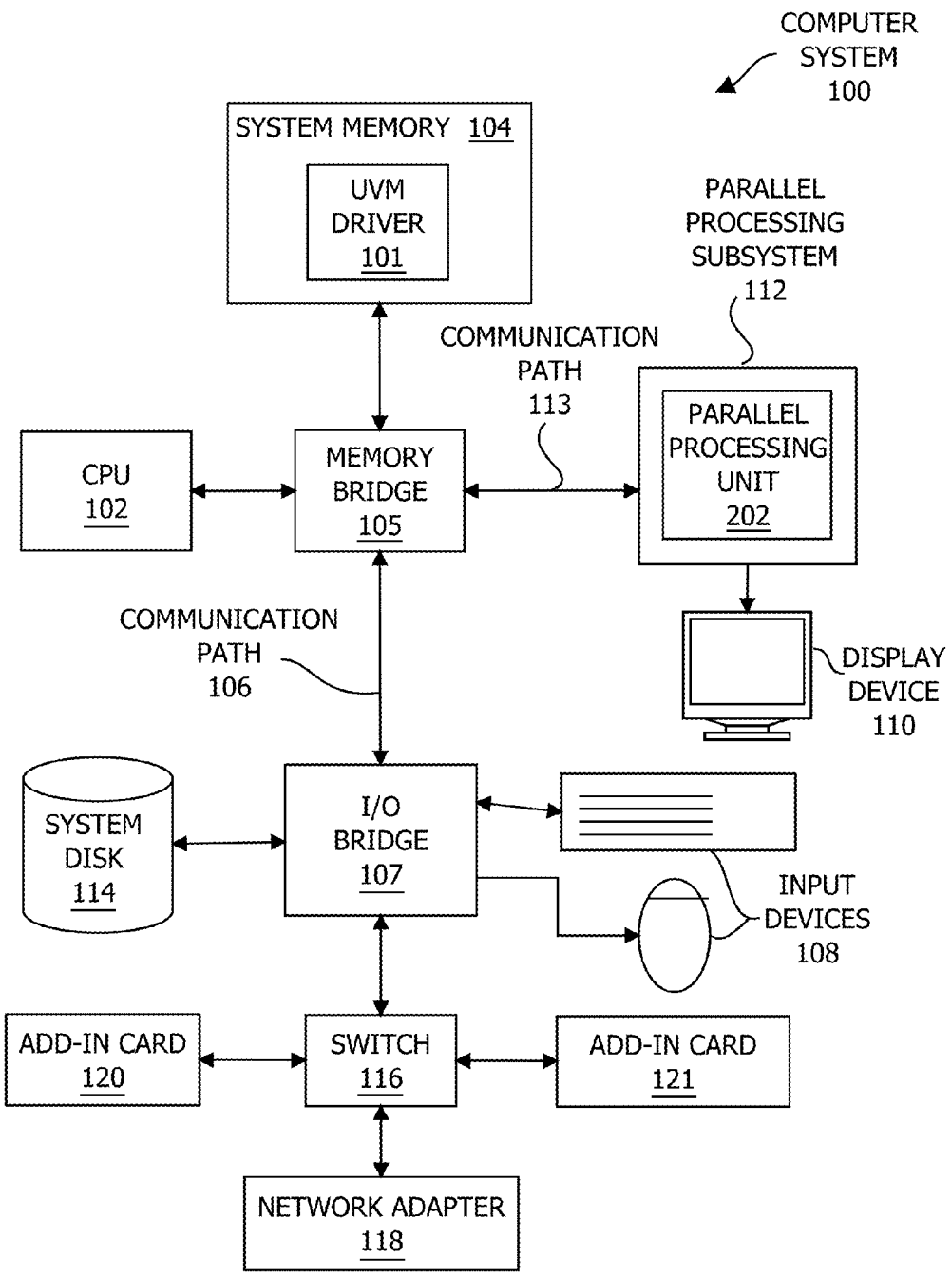
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. A parallel processing subsystem 112 is coupled to memory bridge 105 via a bus or second communication path 113 (e.g., a Peripheral Component Interconnect (PCI) Express, Accelerated Graphics Port, or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, compact disc (CD) drives, digital versatile disc (DVD) drives, film recording devices, and the like, may also be connected to I/O bridge 107. The various communication paths shown in FIG. 1, including the specifically named communication paths 106 and 113 may be implemented using any suitable protocols, such as PCI Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video encode and decode circuitry, and constitutes one or more parallel processing units (PPUs) 202. In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC). As is well-known, many graphics processing units (GPUs) are designed to perform parallel operations and computations and, thus, are considered to be a class of parallel processing unit (PPU).

Any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

PPU 202 advantageously implements a highly parallel processing architecture. PPU 202 includes a number of general processing clusters (GPCs). Each GPC is capable of executing a large number (e.g., hundreds or thousands) of threads concurrently, where each thread is an instance of a program. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads. Unlike a SIMD execution regime, where all processing engines typically execute identical instructions, SIMT execution allows different threads to more readily follow divergent execution paths through a given thread program.

GPCs include a number of streaming multiprocessors (SMs), where each SM is configured to process one or more thread groups. The series of instructions transmitted to a particular GPC constitutes a thread, as previously defined herein, and the collection of a certain number of concurrently executing threads across the parallel processing engines within an SM is referred to herein as a "warp" or "thread group." As used herein, a "thread group" refers to a group of threads concurrently executing the same program on different input data, with one thread of the group being assigned to a different processing engine within an SM. Additionally, a plurality of related thread groups may be active (in different phases of execution) at the same time within an SM. This collection of thread groups is referred to herein as a "cooperative thread array" ("CTA") or "thread array."

In embodiments of the present invention, it is desirable to use PPU 202 or other processor(s) of a computing system to execute general-purpose computations using thread arrays. Each thread in the thread array is assigned a unique thread identifier ("thread ID") that is accessible to the thread during the thread's execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

In operation, CPU 102 is the master processor of computer system 100, controlling and coordinating operations of other system components. In particular, CPU 102 issues commands that control the operation of PPUs 202. In one embodiment, communication path 113 is a PCI Express link, in which dedicated lanes are allocated to each PPU 202, as is known in the art. Other communication paths may also be used. PPU 202 advantageously implements a highly parallel processing architecture. A PPU 202 may be provided with any amount of local parallel processing memory (PPU memory).

In some embodiments, system memory 104 includes a unified virtual memory (UVM) driver 101. The UVM driver 101 includes instructions for performing various tasks related to management of a unified virtual memory (UVM) system common to both the CPU 102 and the PPUs 202.

Among other things, the architecture enables the CPU 102 and the PPU 202 to access a physical memory location using a common virtual memory address, regardless of whether the physical memory location is within the system memory 104 or memory local to the PPU 202.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Unified Virtual Memory System Architecture

Figure 2:
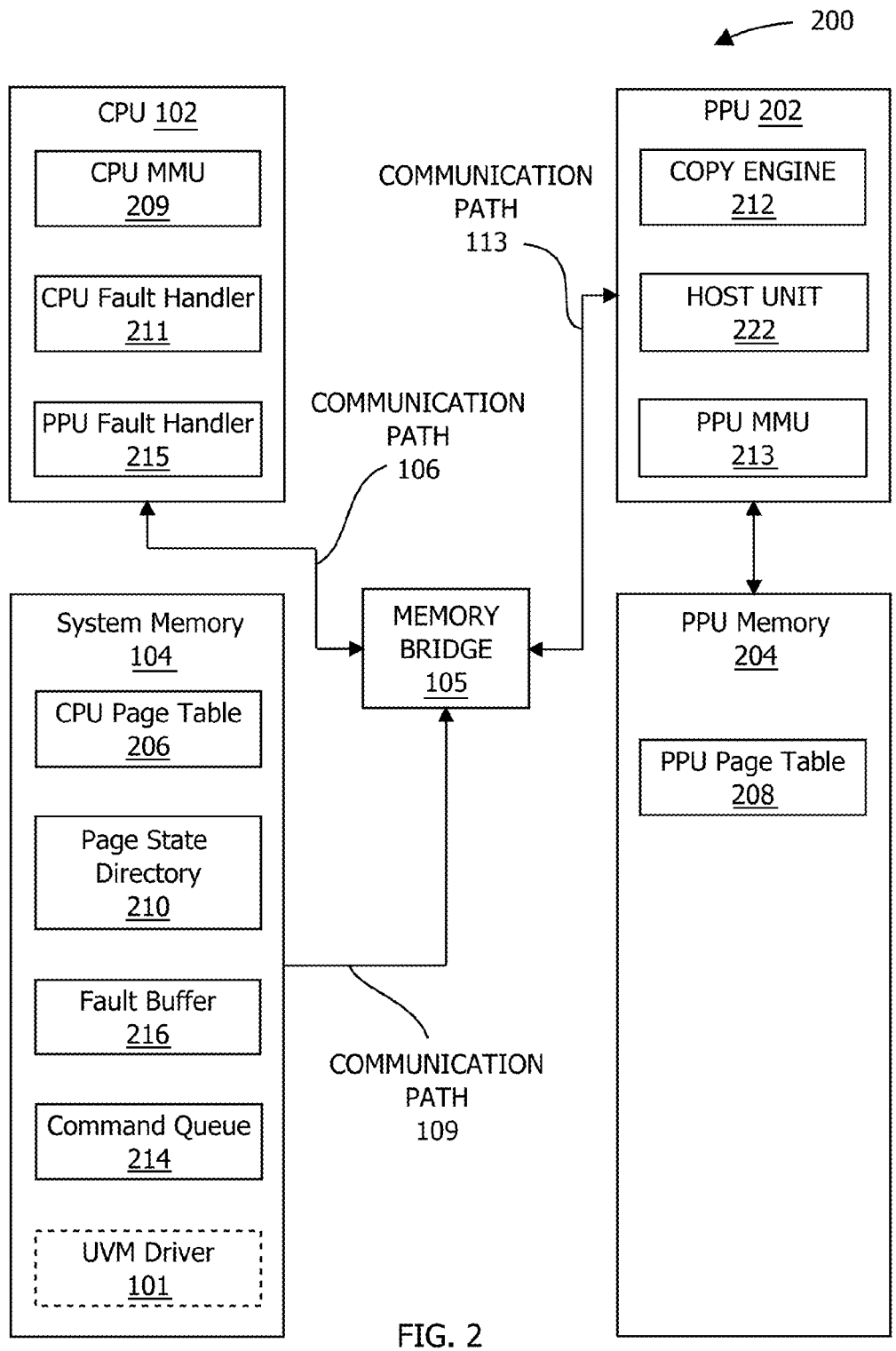
FIG. 2 is a block diagram illustrating a unified virtual memory system (UVM), according to one embodiment of the present invention.

FIG. 2 is a block diagram illustrating a unified virtual memory (UVM) system 200, according to one embodiment of the present invention. As shown, the unified virtual memory system 200 includes, without limitation, the CPU 102, the system memory 104, and the parallel processing unit (PPU) 202 coupled to a parallel processing unit memory (PPU memory) 204. The CPU 102 and the system memory 104 are coupled to each other and to the PPU 202 via the memory bridge 105.

The CPU 102 executes threads that may request data stored in the system memory 104 or the PPU memory 204 via a virtual memory address. Virtual memory addresses shield threads executing in the CPU 102 from knowledge about the internal workings of a memory system. Thus, a thread may only have knowledge of virtual memory addresses, and may access data by requesting data via a virtual memory address.

The CPU 102 includes a CPU MMU 209, which processes requests from the CPU 102 for translating virtual memory addresses to physical memory addresses. The physical memory addresses are required to access data stored in a physical memory unit such as the system memory 104 and the PPU memory 204. The CPU 102 includes a CPU fault handler 211, which executes steps in response to the CPU MMU 209 generating a page fault, to make requested data available to the CPU 102. The CPU fault handler 211 is generally software that resides in the system memory 104 and executes on the CPU 102, the software being provoked by an interrupt to the CPU 102.

The system memory 104 stores various memory pages (not shown) that include data for use by threads executing on the CPU 102 or the PPU 202. As shown, the system memory 104 stores a CPU page table 206, which includes mappings between virtual memory addresses and physical memory addresses. The system memory 104 also stores a page state directory 210, which acts as a "master page table" for the UVM system 200, as is discussed in greater detail below. The system memory 104 stores a fault buffer 216, which includes entries written by the PPU 202 in order to inform the CPU 102 of a page fault generated by the PPU 202. In some embodiments, the system memory 104 includes the unified virtual memory (UVM) driver 101, which includes instructions that, when executed, cause the CPU 102 to execute commands for, among other things, remedying a page fault.

As shown, the CPU 102 communicates with a PPU 202 via the communication path 113 and the memory bridge 105. As also shown, the PPU 202 includes, without limitation, a host unit 222, a PPU MMU 213, and a copy engine 212. The PPU 202 executes instructions that may request data stored in the system memory 104 or the PPU memory 204 via a virtual memory address. In operation, the host unit 222 reads commands from one or more command queues 214, interprets the commands and schedules associated operations for execution by appropriate units included in the PPU 202. For instance, the host unit 222 may read a command from the command queue 214, interpret the command, and direct memory-related operations associated with the command to the copy engine 212. Typically, each command queue 214 is a push buffer that may be included in either the PPU memory 204 or the system memory 104, but is preferentially located in the system memory 104.

In a similar manner as with the CPU MMU 209 and the CPU 102, the PPU MMU 213 processes requests from the PPU 202 for translating virtual memory addresses to physical memory addresses. The copy engine 212 executes memory-related operations such as copying memory pages and modifying data in a PPU page table 208. A PPU fault handler 215 executes steps in response to a page fault on the PPU 202. The PPU fault handler 215 can be software running on a processor or dedicated microcontroller in the PPU 202, or the PPU fault handler 215 can be software running on the CPU 102, with the latter being the preferred choice. In some embodiments, the CPU fault handler 211 and the PPU fault handler 215 can be a unified software program that is invoked by a fault on either the CPU 102 or the PPU 202. In alternate embodiments, the computer system 100 includes an IO MMU that provides for virtualization of the PPU 202.

In some embodiments, the CPU fault handler 211 and the UVM driver 101 may be a unified software program. In such cases, the unified software program may be software that resides in the system memory 104 and executes on the CPU 102. The PPU fault handler 215 may be a separate software program running on a processor or dedicated microcontroller in the PPU 202, or the PPU fault handler 215 may be a separate software program running on the CPU 102.

In other embodiments, the PPU fault handler 215 and the UVM driver 101 may be a unified software program. In such cases, the unified software program may be software that resides in the system memory 104 and executes on the CPU 102. The CPU fault handler 211 may be a separate software program that resides in the system memory 104 and executes on the CPU 102.

In other embodiments, the CPU fault handler 211, the PPU fault handler 215, and the UVM driver 101 may be a unified software program. In such cases, the unified software program may be software that resides in the system memory 104 and executes on the CPU 102.

In some embodiments, the CPU fault handler 211, the PPU fault handler 215, and the UVM driver 101 may all reside in system memory 104, as described above. As shown in FIG. 2, the UVM driver 101 resides in system memory 104, while the CPU fault handler 211 and the PPU fault handler 215 reside in the CPU 102.

The CPU fault handler 211 and the PPU fault handler 215 are responsive to hardware interrupts that may emanate from the CPU 102 or the PPU 202, such as interrupts resulting from a page fault. As further described below, the UVM driver 101 includes instructions for performing various tasks related to management of the UVM system 200, including, without limitation, remedying a page fault, and accessing the CPU page table 206, the page state directory 210, and/or the fault buffer 216.

In some embodiments, the CPU page table 206 and the PPU page table 208 have different formats, and contain different information; for example, the PPU page table 208 may contain the following while the CPU page table 206 does not: atomic disable bit; compression tags; and tiled memory type.

In a similar manner as with the system memory 104, the PPU memory 204 stores various memory pages (not shown). As shown, the PPU memory 204 also includes the PPU page table 208, which includes mappings between virtual memory addresses and physical memory addresses. Alternatively, the PPU page table 208 may be stored in the system memory 104.

Translating Virtual Memory Addresses

When a thread executing in the CPU 102 requests data via a virtual memory address, the CPU 102 requests translation of the virtual memory address to a physical memory address, from the CPU memory management unit (CPU MMU) 209. In response, the CPU MMU 209 attempts to translate the virtual memory address into a physical memory address, which specifies a location in a memory unit, such as the system memory 104, that stores the data requested by the CPU 102.

To translate a virtual memory address to a physical memory address, the CPU MMU 209 performs a lookup operation to determine if the CPU page table 206 includes a mapping associated with the virtual memory address. In addition to a virtual memory address, a request to access data may also indicate a virtual memory address space. The unified virtual memory system 200 may implement multiple virtual memory address spaces, each of which is assigned to one or more threads. Virtual memory addresses are unique within any given virtual memory address space. Further, virtual memory addresses within a given virtual memory address space are consistent across the CPU 102 and the PPU 202, thereby allowing the same virtual address to refer to the same data across the CPU 102 and the PPU 202. In some embodiments, two virtual memory addresses may refer to the same data, but may not map to the same physical memory address (e.g., the CPU 102 and the PPU 202 may each have a local read-only copy of the data.)

For any given virtual memory address, the CPU page table 206 may or may not include a mapping between the virtual memory address and a physical memory address. If the CPU page table 206 includes a mapping, then the CPU MMU 209 reads that mapping to determine a physical memory address associated with the virtual memory address and provides that physical memory address to the CPU 102. However, if the CPU page table 206 does not include a mapping associated with the virtual memory address, then the CPU MMU 209 is unable to translate the virtual memory address into a physical memory address, and the CPU MMU 209 generates a page fault. To remedy a page fault and make the requested data available to the CPU 102, a "page fault sequence" is executed. More specifically, the CPU 102 reads the PSD 210 to find the current mapping state of the page and then determines the appropriate page fault sequence. The page fault sequence generally maps the memory page associated with the requested virtual memory address or changes the types of accesses permitted (e.g., read access, write access, atomic access). The different types of page fault sequences implemented in the UVM system 200 are discussed in greater detail below.

Within the UVM system 200, data associated with a given virtual memory address may be stored in the system memory 104, in the PPU memory 204, or in both the system memory 104 and the PPU memory 204 as read-only copies of the same data. Further, for any such data, either or both of the CPU page table 206 or the PPU page table 208 may include a mapping associated with that data. Notably, some data exists for which a mapping exists in one page table, but not in the other. However, the PSD 210 includes all mappings stored in the PPU page table 208, and the PPU-relevant mappings stored in the CPU page table 206. The PSD 210 thus functions as a "master" page table for the unified virtual memory system 200. Therefore, when the CPU MMU 209 does not find a mapping in the CPU page table 206 associated with a particular virtual memory address, the CPU 102 reads the PSD 210 to determine whether the PSD 210 includes a mapping associated with that virtual memory address. Various embodiments of the PSD 210 may include different types of information associated with virtual memory addresses in addition to mappings associated with the virtual memory address.

When the CPU MMU 209 generates a page fault, the CPU fault handler 211 executes a sequence of operations for the appropriate page fault sequence to remedy the page fault. Again, during a page fault sequence, the CPU 102 reads the PSD 210 and executes additional operations in order to change the mappings or permissions within the CPU page table 206 and the PPU page table 208. Such operations may include reading and/or modifying the CPU page table 206, reading and/or modifying page state directory 210 entries, and/or migrating blocks of data referred to as "memory pages" between memory units (e.g., the system memory 104 and the PPU memory 204).

To determine which operations to execute in a page fault sequence, the CPU 102 identifies the memory page associated with the virtual memory address. The CPU 102 then reads state information for the memory page from the PSD 210 related to the virtual memory address associated with the memory access request that caused the page fault. Such state information may include, among other things, an ownership state for the memory page associated with the virtual memory address. For any given memory page, several ownership states are possible. For example, a memory page may be "CPU-owned," "PPU-owned," or "CPU-shared." A memory page is considered CPU-owned if the CPU 102 can access the memory page via a virtual address, and if the PPU 202 cannot access the memory page via a virtual address without causing a page fault. Preferably, a CPU-owned page resides in the system memory 104, but can reside in the PPU memory 204. A memory page is considered PPU-owned if the PPU 202 can access the page via a virtual address, and if the CPU 102 cannot access the memory page via a virtual address without causing a page fault. Preferably, a PPU-owned page resides in the PPU memory 204, but can reside in the system memory 104 when migration from the system memory 104 to the PPU memory 204 is not done, generally due to the short-term nature of the PPU ownership. Finally, a memory page is considered CPU-shared if the memory page is stored in the system memory 104 and a mapping to the memory page exists in the PPU page table 208 that allows the PPU 202 to access the memory page in the system memory 104 via a virtual memory address.

The UVM system 200 may assign ownership states to memory pages based on a variety of factors, including the usage history of the memory page. Usage history may include information regarding whether the CPU 102 or the PPU 202 accessed the memory page recently, and how many times such accesses were made. For example, the UVM system 200 may assign an ownership state of "CPU-owned" for a given memory page and locate the page in the system memory 104 if, based on the usage history of the memory page, the UVM system 200 determines that the memory page is likely to be used mostly or only by the CPU 102. Similarly, the UVM system 200 may assign an ownership of "PPU-owned" for a given memory page and locate the page in the PPU memory 204 if, based on the usage history of the memory page, the UVM system 200 determines that the memory page is likely to be used mostly or only by the PPU 202. Finally, the UVM system 200 may assign an ownership of "CPU-shared" for a given memory page if, based on the usage history of the memory page, the UVM system 200 determines that the memory page is likely to be used both by the CPU 102 and by the PPU 202, and that migrating the memory page back and forth from the system memory 104 to the PPU memory 204 would consume too much time.

As examples, the fault handlers 211 and 215 can implement any or all of the following heuristics for migrating:

(a) on the CPU 102 access to an unmapped page that is mapped to the PPU 202, that has not been recently migrated, unmap the faulting page from the PPU 202, migrate the page to the CPU 102, and map the page to the CPU 102;

(b) on the PPU 202 access to an unmapped page that is mapped to the CPU 102, that has not been recently migrated, unmap the faulting page from the CPU 102, migrate the page to the PPU 202, and map the page to the PPU 202;

(c) on the CPU 102 access to an unmapped page that is mapped to the PPU 202, that has been recently migrated, migrate the faulting page to the CPU 102 and map the page on both the CPU 102 and the PPU 202;

(d) on the PPU 102 access to an unmapped page that is mapped on the CPU 102, that has been recently migrated, map the page to both the CPU 102 and the PPU 202;

(e) on the PPU 102 atomic access to page that is mapped to both the CPU 102 and the PPU 202 but not enabled for atomic operations by the PPU 202, unmap the page from the CPU 102, and map to the PPU 202 with atomic operations enabled;

(f) on the PPU 102 write access to page that is mapped on the CPU 102 and PPU 202 as copy-on-write (COW), copy the page to the PPU 202, thereby making independent copies of the page, mapping the new page as read-write on the PPU, and leaving the current page as mapped on the CPU 102;

(g) on the PPU 102 read access to page that is mapped on the CPU 102 and PPU 202 as zero-fill-on-demand (ZFOD), allocate a page of physical memory on the PPU 202 and fill it with zeros, and map that page on the PPU, but change it to unmapped on the CPU 102.

(h) on an access by a first PPU 202(1) to an unmapped page that is mapped on a second PPU 202(2), that has not been recently migrated, unmap the faulting page from the second PPU 202(2), migrate the page to the first PPU 202(1), and map the page to the first PPU 202(1); and (i) on an access by a first PPU 202(1) to an unmapped page that is mapped on a second PPU 202(2), that has been recently migrated, map the faulting page to the first PPU 202(1), and keep the mapping of the page on the second PPU 202(2).

In sum, many heuristic rules are possible, and the scope of the present invention is not limited to these examples.

In addition, any migration heuristic can "round up" to include more pages or a larger page size, for example:

(j) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, and map the pages to the CPU 102 (in more detailed example: for a 4 kB faulted page, migrate the aligned 64 kB region that includes the 4 kB faulted page);

(k) on the PPU 202 access to an unmapped page that is mapped to the CPU 102, that has not been recently migrated, unmap the faulting page, plus additional pages that are adjacent to the faulting page in the virtual address space, from the CPU 102, migrate the pages to the PPU 202, and map the pages to the PPU 202 (in more detailed example: for a 4 kB faulted page, migrate the aligned 64 kB region that includes the 4 kB faulted page);

(l) on the CPU 102 access to an unmapped page that is mapped to the PPU 202, that has not been recently migrated, unmap the faulting page, plus additional pages that are adjacent to the faulting page in the virtual address space, from the PPU 202, migrate the pages to the CPU 102, map the pages to the CPU 102, and treat all the migrated pages as one or more larger pages on the CPU 102 (in more detailed example: for a 4 kB faulted page, migrate the aligned 64 kB region that includes the 4 kB faulted page, and treat the aligned 64 kB region as a 64 kB page);

(m) on the PPU 202 access to an unmapped page that is mapped on the CPU 102, that has not been recently migrated, unmap the faulting page, plus additional pages that are adjacent to the faulting page in the virtual address space, from the CPU 102, migrate the pages to the PPU 202, map the pages to the PPU 202, and treat all the migrated pages as one or more larger pages on the PPU 202 (in more detailed example: for a 4 kB faulted page, migrate the aligned 64 kB region that includes the 4 kB faulted page, and treat the aligned 64 kB region as a 64 kB page);

(n) on the access by a first PPU 202(1) to an unmapped page that is mapped to a second PPU 202(2), that has not been recently migrated, unmap the faulting page, plus additional pages that are adjacent to the faulting page in the virtual address space, from the second PPU 202(2), migrate the pages to the first PPU 202(1), and map the pages to the first PPU 202(1); and (o) on an access by a first PPU 202(1) to an unmapped page that is mapped to a second PPU 202(2), that has been recently migrated, map the faulting page, plus additional pages that are adjacent to the faulting page in the virtual address space, to the first PPU 202(1), and keep the mapping of the page on the second PPU 202(2).

In sum, many heuristic rules that include "rounding up" are possible, and scope of the present invention is not limited to these examples.

In some embodiments, the PSD entries may include transitional state information to ensure proper synchronization between various requests made by units within the CPU 102 and the PPU 202. For example, a PSD 210 entry may include a transitional state indicating that a particular page is in the process of being transitioned from CPU-owned to PPU-owned. Various units in the CPU 102 and the PPU 202, such as the CPU fault handler 211 and the PPU fault handler 215, upon determining that a page is in such a transitional state, may forego portions of a page fault sequence to avoid steps in a page fault sequence triggered by a prior virtual memory access to the same virtual memory address. As a specific example, if a page fault results in a page being migrated from the system memory 104 to the PPU memory 204, a different page fault that would cause the same migration is detected and does not cause another page migration. Further, various units in the CPU 102 and the PPU 202 may implement atomic operations for proper ordering of operations on the PSD 210. For example, for modifications to PSD 210 entries, the CPU fault handler 211 or the PPU fault handler 215 may issue an atomic compare and swap operation to modify the page state of a particular entry in the PSD 210. Consequently, the modification is done without interference by operations from other units.

Multiple PSDs 210 may be stored in the system memory 104—one for each virtual memory address space. A memory access request generated by either the CPU 102 or the PPU 202 may therefore include a virtual memory address and also identify the virtual memory address space associated with that virtual memory address.

Just as the CPU 102 may execute memory access requests that include virtual memory addresses (i.e., instructions that include requests to access data via a virtual memory address), the PPU 202 may also execute similar types of memory access requests. More specifically, the PPU 202 includes a plurality of execution units, such as GPCs and SMs, described above in conjunction with FIG. 1, that are configured to execute multiple threads and thread groups. In operation, those threads may request data from memory (e.g., the system memory 104 or the PPU memory 204) by specifying a virtual memory address. Just as with the CPU 102 and the CPU MMU 209, the PPU 202 includes the PPU memory management unit (MMU) 213. The PPU MMU 213 receives requests for translation of virtual memory addresses from the PPU 202, and attempts to provide a translation from the PPU page table 208 for the virtual memory addresses.

Similar to the CPU page table 206, the PPU page table 208 includes mappings between virtual memory addresses and physical memory addresses. As is also the case with the CPU page table 206, for any given virtual address, the PPU page table 208 may not include a page table entry that maps the virtual memory address to a physical memory address. As with the CPU MMU 209, when the PPU MMU 213 requests a translation for a virtual memory address from the PPU page table 208 and either no mapping exists in the PPU page table 208 or the type of access is not allowed by the PPU page table 208, the PPU MMU 213 generates a page fault. Subsequently, the PPU fault handler 215 triggers a page fault sequence. Again, the different types of page fault sequences implemented in the UVM system 200 are described in greater detail below.

During a page fault sequence, the CPU 102 or the PPU 202 may write commands into the command queue 214 for execution by the copy engine 212. Such an approach frees up the CPU 102 or the PPU 202 to execute other tasks while the copy engine 212 reads and executes the commands stored in the command queue 214, and allow all the commands for a fault sequence to be queued at one time, thereby avoiding the monitoring of progress of the fault sequence. Commands executed by the copy engine 212 may include, among other things, deleting, creating, or modifying page table entries in the PPU page table 208, reading or writing data from the system memory 104, and reading or writing data to the PPU memory 204.

The fault buffer 216 stores fault buffer entries that indicate information related to page faults generated by the PPU 202. Fault buffer entries may include, for example, the type of access that was attempted (e.g., read, write, or atomic), the virtual memory address for which an attempted access caused a page fault, the virtual address space, and an indication of a unit or thread that caused a page fault. In operation, when the PPU 202 causes a page fault, the PPU 202 may write a fault buffer entry into the fault buffer 216 to inform the PPU fault handler 215 about the faulting page and the type of access that caused the fault. The PPU fault handler 215 generally runs on the CPU 102, and performs actions to remedy the page fault. The fault buffer 216 can store multiple faults because the PPU 202 is executing a plurality of threads, where each thread can cause a one or more faults due the pipelined nature of the memory accesses of the PPU 202.

Page Fault Sequences

As stated above, in response to receiving a request for translation of a virtual memory address, the CPU MMU 209 generates a page fault if the CPU page table 206 does not include a mapping associated with the requested virtual memory address or does not permit the type of access being requested. Similarly, in response to receiving a request for translation of a virtual memory address, the PPU MMU 213 generates a page fault if the PPU page table 208 does not include a mapping associated with the requested virtual memory address or does not permit the type of access being requested. When the CPU MMU 209 or the PPU MMU 213 generates a page fault, the thread that requested the data at the virtual memory address stalls, and a "local fault handler"—the CPU fault handler 211 for the CPU 102 or the PPU fault handler 215 for the PPU 202—attempts to remedy the page fault by executing a "page fault sequence." As indicated above, a page fault sequence includes a series of operations that enable the faulting unit (i.e., the unit—either the CPU 102 or the PPU 202—that caused the page fault) to access the data associated with the virtual memory address. After the page fault sequence completes, the thread that requested the data via the virtual memory address resumes execution. In some embodiments, fault recovery is simplified by allowing the fault recovery logic to track faulting memory accesses as opposed to faulting instructions.

The operations executed during a page fault sequence depend on the change in ownership state or change in access permissions, if any, that the memory page associated with the page fault has to undergo. The transition from a current ownership state to a new ownership state, or a change in access permissions, may be part of the page fault sequence. In some instances, migrating the memory page associated with the page fault from the system memory 104 to the PPU memory 204 is also part of the page fault sequence. In other instances, migrating the memory page associated with the page fault from the PPU memory 204 to the system memory 104 is also part of the page fault sequence. Various heuristics, more fully described herein, may be used to configure UVM system 200 to change memory page ownership state or to migrate memory pages under various sets of operating conditions and patterns. Described in greater detail below are page fault sequences for the following four memory page ownership state transitions: CPU-owned to CPU-shared, CPU-owned to PPU-owned, PPU-owned to CPU-owned, and PPU-owned to CPU-shared.

A fault by the PPU 202 may initiate a transition from CPU-owned to CPU-shared. Prior to such a transition, a thread executing in the PPU 202 attempts to access data at a virtual memory address that is not mapped in the PPU page table 208. This access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state as well as other factors, such as usage characteristics for the memory page or the type of memory access, the PPU fault handler 215 determines that a new ownership state for the page should be CPU-shared.

To change the ownership state, the PPU fault handler 215 writes a new entry in the PPU page table 208 corresponding to the virtual memory address and associating the virtual memory address with the memory page identified via the PSD 210 entry. The PPU fault handler 215 also modifies the PSD 210 entry for that memory page to indicate that the ownership state is CPU-shared. In some embodiments, an entry in a translation look-aside buffer (TLBs) in the PPU 202 is invalidated to account for the case where the translation to an invalid page is cached. At this point, the page fault sequence is complete. The ownership state for the memory page is CPU-shared, meaning that the memory page is accessible to both the CPU 102 and the PPU 202. Both the CPU page table 206 and the PPU page table 208 include entries that associate the virtual memory address to the memory page.

A fault by the PPU 202 may initiate a transition from CPU-owned to PPU-owned. Prior to such a transition, an operation executing in the PPU 202 attempts to access memory at a virtual memory address that is not mapped in the PPU page table 208. This memory access attempt causes a PPU-based page fault, which then causes a fault buffer entry to be written to the fault buffer 216. In response, the PPU fault handler 215 reads the PSD 210 entry corresponding to the virtual memory address and identifies the memory page associated with the virtual memory address. After reading the PSD 210, the PPU fault handler 215 determines that the current ownership state for the memory page associated with the virtual memory address is CPU-owned. Based on the current ownership state, as well as other factors, such as usage characteristics for the page or the type of memory access, the PPU fault handler 215 determines that a new ownership state for the page is PPU-owned.

The PPU 202 writes a fault buffer entry into fault buffer 216 that indicates that the PPU 202 generated a page fault, and indicates the virtual memory address associated with the page fault. The PPU fault hander 215 executing on the CPU 102 reads the fault buffer entry and, in response, the CPU 102 removes the mapping in the CPU page table 206 associated with the virtual memory address that caused the page fault. The CPU 102 may flush caches before and/or after the mapping is removed. The CPU 102 also writes commands into the command queue 214 instructing the PPU 202 to copy the page from the system memory 104 into the PPU memory 204. The copy engine 212 in the PPU 202 reads the commands in the command queue 214 and copies the page from the system memory 104 to the PPU memory 204. The PPU 202 writes a page table entry into the PPU page table 208 corresponding to the virtual memory address and associating the virtual memory address with the newly copied memory page in the PPU memory 204. The writing to the PPU page table 208 may be done via the copy engine 212. Alternatively, the CPU 102 can update the PPU page table 208. The PPU fault handler 215 also modifies the PSD 210 entry for that memory page to indicate that the ownership state is PPU-owned. In some embodiments, entries in TLBs in the PPU 202 or the CPU 102 may be invalidated, to account for the case where the translation was cached. At this point, the page fault sequence is complete. The ownership state for the memory page is PPU-owned, meaning that the memory page is accessible only to the PPU 202. Only the PPU page table 208 includes an entry that associates the virtual memory address with the memory page.

A fault by the CPU 102 may initiate a transition from PPU-owned to CPU-owned. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state, as well as other factors, such as usage characteristics for the page or the type of access, the CPU fault handler 211 determines that a new ownership state for the page is CPU-owned.

The CPU fault handler 211 changes the ownership state associated with the memory page to CPU-owned. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104, which may be done via the command queue 214 and the copy engine 212. The CPU fault handler 211 writes a page table entry into the CPU page table 206 that associates the virtual memory address with the memory page that is copied into the system memory 104. The CPU fault handler 211 also updates the PSD 210 to associate the virtual memory address with the newly copied memory page. At this point, the page fault sequence is complete. The ownership state for the memory page is CPU-owned, meaning that the memory page is accessible only to the CPU 102. Only the CPU page table 206 includes an entry that associates the virtual memory address with the memory page.

A fault by the CPU 102 may initiate a transition from PPU-owned to CPU-shared. Prior to such a transition, an operation executing in the CPU 102 attempts to access memory at a virtual memory address that is not mapped in the CPU page table 206, which causes a CPU-based page fault. The CPU fault handler 211 reads the PSD 210 entry corresponding to the virtual memory address and identifies the memory page associated with the virtual memory address. After reading the PSD 210, the CPU fault handler 211 determines that the current ownership state for the memory page associated with the virtual memory address is PPU-owned. Based on the current ownership state or the type of access, as well as other factors, such as usage characteristics for the page, the CPU fault handler 211 determines that a new ownership state for the memory page is CPU-shared.

The CPU fault handler 211 changes the ownership state associated with the memory page to CPU-shared. The CPU fault handler 211 writes a command into the command queue 214 to cause the copy engine 212 to remove the entry from the PPU page table 208 that associates the virtual memory address with the memory page. Various TLB entries may be invalidated. The CPU fault handler 211 also copies the memory page from the PPU memory 204 into the system memory 104. This copy operation may be done via the command queue 214 and the copy engine 212. The CPU fault handler 211 then writes a command into the command queue 214 to cause the copy engine 212 to change the entry in PPU page table 208 such that the virtual memory address is associated with the memory page in the system memory 104. Various TLB entries may be invalidated. The CPU fault handler 211 writes a page table entry into the CPU page table 206 to associate the virtual memory address with the memory page in the system memory 104. The CPU fault handler 211 also updates the PSD 210 to associate the virtual memory address with the memory page in system memory 104. At this point, the page fault sequence is complete. The ownership state for the page is CPU-shared, and the memory page has been copied into the system memory 104. The page is accessible to the CPU 102, since the CPU page table 206 includes an entry that associates the virtual memory address with the memory page in the system memory 104. The page is also accessible to the PPU 202, since the PPU page table 208 includes an entry that associates the virtual memory address with the memory page in the system memory 104.

Detailed Example of a Page Fault Sequence

With this context, a detailed description of a page fault sequence executed by the PPU fault handler 215 in the event of a transition from CPU-owned to CPU-shared is now provided to show how atomic operations and transition states may be used to more effectively manage a page fault sequence. The page fault sequence is triggered by a PPU 202 thread attempting to access a virtual address for which a mapping does not exist in the PPU page table 208. When a thread attempts to access data via a virtual memory address, the PPU 202 (specifically, a user-level thread) requests a translation from the PPU page table 208. A PPU page fault occurs in response because the PPU page table 208 does not include a mapping associated with the requested virtual memory address.

After the page fault occurs, the thread enters a trap, stalls, and the PPU fault handler 215 executes a page fault sequence. The PPU fault handler 215 reads the PSD 210 to determine which memory page is associated with the virtual memory address and to determine the state for the virtual memory address. The PPU fault handler 215 determines, from the PSD 210, that the ownership state for that memory page is CPU-owned. Consequently, the data requested by the PPU 202 is inaccessible to the PPU 202 via a virtual memory address. State information for the memory page also indicates that the requested data cannot be migrated to the PPU memory 204.

Based on the state information obtained from the PSD 210, the PPU fault handler 215 determines that a new state for the memory page should be CPU-shared. The PPU fault handler 215 changes the state to "transitioning to CPU-shared." This state indicates that the page is currently in the process of being transitioned to CPU-shared.

The PPU 202 updates the PPU page table 208 to associate the virtual address with the memory page. The PPU 202 also invalidates the TLB cache entries. Next, the PPU 202 changes the ownership state associated with the memory page to CPU-shared. Finally, the page fault sequence ends, and the thread that requested the data via the virtual memory address resumes execution.

UVM System Architecture Variations

Various modifications to the unified virtual memory system 200 are possible. For example, in some embodiments, after writing a fault buffer entry into the fault buffer 216, the PPU 202 may trigger a CPU interrupt to cause the CPU 102 to read fault buffer entries in the fault buffer 216 and perform whatever operations are appropriate in response to the fault buffer entry. In other embodiments, the CPU 102 may periodically poll the fault buffer 216. In the event that the CPU 102 finds a fault buffer entry in the fault buffer 216, the CPU 102 executes a series of operations in response to the fault buffer entry.

In some embodiments, the system memory 104, rather than the PPU memory 204, stores the PPU page table 208. In other embodiments, a single or multiple-level cache hierarchy, such as a single or multiple-level translation look-aside buffer (TLB) hierarchy (not shown), may be implemented to cache virtual address translations for either the CPU page table 206 or the PPU page table 208.

In yet other embodiments, in the event that a thread executing in the PPU 202 causes a PPU fault (a "faulting thread"), the PPU 202 may take one or more actions. These actions include: stall the entire PPU 202, stall the SM executing the faulting thread, stall the PPU MMU 213, stall only the faulting thread, or stall one or more levels of TLBs. In some embodiments, after a PPU page fault occurs, and a page fault sequence has been executed by the unified virtual memory system 200, execution of the faulting thread resumes, and the faulting thread attempts, again, to execute the memory access request that caused the page fault. In some embodiments, stalling at a TLB is done in such a way as to appear as a long-latency memory access to the faulting SM or faulting thread, thereby not requiring the SM to do any special operation for a fault.

Finally, in other alternative embodiments, the UVM driver 101 may include instructions that cause the CPU 102 to execute one or more operations for managing the UVM system 200 and remedying a page fault, such as accessing the CPU page table 206, the PSD 210, and/or the fault buffer 216. In other embodiments, an operating system kernel (not shown) may be configured to manage the UVM system 200 and remedy a page fault by accessing the CPU page table 206, the PSD 210, and/or the fault buffer 216. In yet other embodiments, an operating system kernel may operate in conjunction with the UVM driver 101 to manage the UVM system 200 and remedy a page fault by accessing the CPU page table 206, the PSD 210, and/or the fault buffer 21.

PPU with Support for Demand Paging

As set forth above, as part of remedying page faults, the UVM system 200 may write commands into the command queue 214 for execution by engines within the PPU 202, such as the copy engine 212. In many prior-art systems, if the copy engine performs an unsuccessful memory access that causes a page fault, then the copy engine stalls and is unavailable to service the page fault. Since the page fault is not corrected, the PPU may not operate as intended. Thus, such prior-art systems do not support demand paging (i.e., accessing data via a virtual memory address that is not appropriately mapped to an accessible physical memory before the memory access request) across all of the engines included in the PPU. Advantageously, the UVM system 200 is configured to support demand paging across the PPU 202, including engines that are unable to successfully stall in the presence of page faults, such as the copy engine 212. In some embodiments, the UVM system 200 may be configured to support demand paging across any number and type of engines or units, such as a direct memory access units, video compression units, and video decompression units (not shown).

In some embodiments, the copy engine 212 does not read the commands from the command queue 214 directly. Instead, the host unit 222 reads the commands included in the command queue 214, interprets the commands, and then relays appropriate operations associated with the commands to the copy engine 212. Before sending any operation to an engine that does not tolerate stalling upon encountering a page fault, the host unit 222 ensures that the PPU page table 208 includes appropriate mappings. Notably, the host unit 222 ensures that the PPU page table 208 includes mappings that enable the engine to perform the operation on physical memory via the virtual memory addresses associated with the operation. For instance, if the host unit 222 receives a copy command for the copy engine 212, then the host unit 222 ensures that mappings included in the PPU page table 208 enable the copy engine 212 to read from the associated source memory pages and write to the destination memory pages. The host unit 222 feeds commands to various engines and these engines may be operating in different virtual address spaces. Further, different commands for a particular engine may use different virtual address spaces. Accordingly, the host unit 222 must ensure the existence of the needed mappings in the virtual address space that corresponds to the command.

Figure 3:
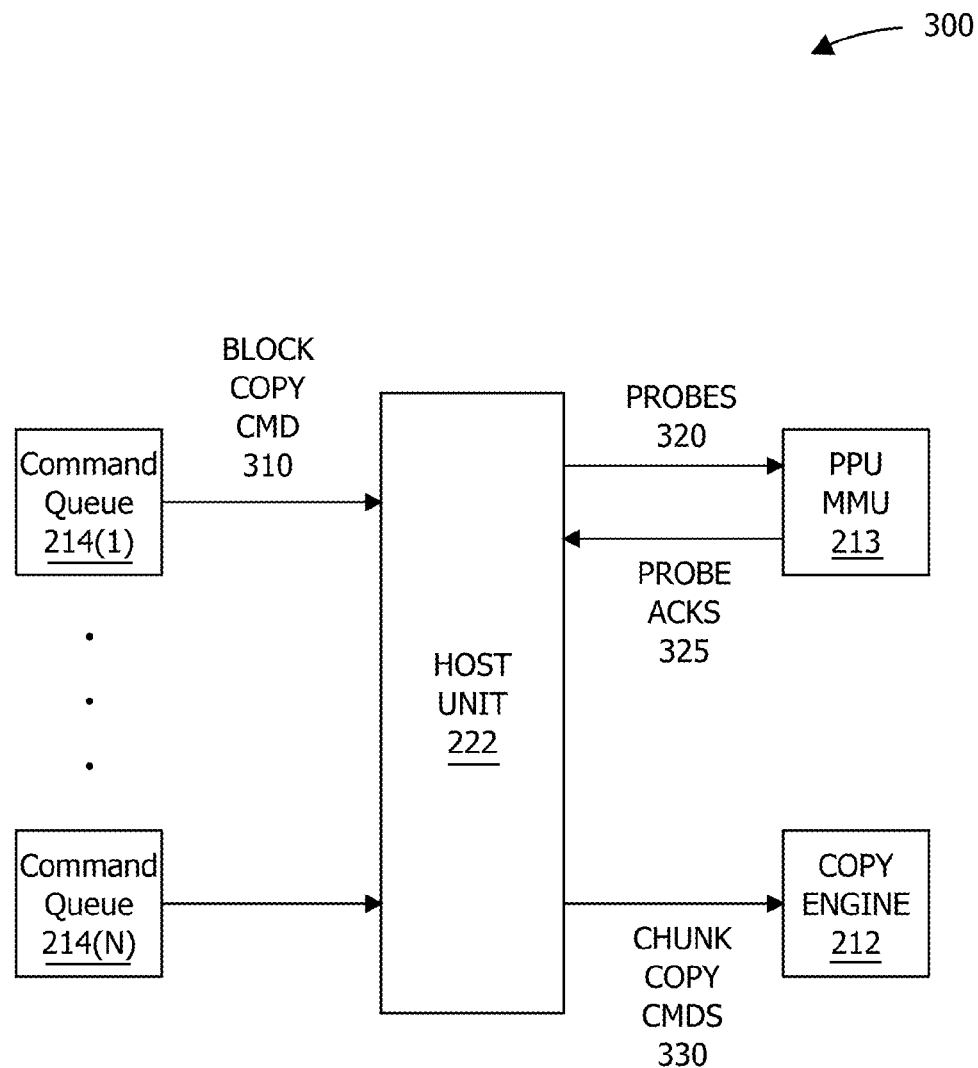
FIG. 3 is a conceptual diagram illustrating how a block copy command is processed within the parallel processing unit of FIG. 2, according to one embodiment of the present invention.

FIG. 3 is a conceptual diagram illustrating how a block copy command 310 is processed within the parallel processing unit (PPU) 202 of FIG. 2, according to one embodiment of the present invention. As shown, the host unit 222 of FIG. 2 reads the block copy command (cmd) 310 from the command queue 214(1). Notably, there may be any number of command queues 214, and the host unit 222 may process instructions included in the command queues 214 in any technically feasible order.

Upon reading the block copy cmd 310 to copy a block from a source virtual memory address to a destination virtual memory address, the host unit 222 may split the block copy cmd 310 into one or more smaller chunk copy cmds 330. For example, suppose that the block copy cmd 310 were to specify a 16 KB copy and the host unit 222 were configured to split block copies into 4 KB chunk copies. In such a scenario, the host unit 222 would split the 16 KB block copy into four 4 KB chunk copies. Further, the source virtual memory address and the destination virtual memory address are not necessarily aligned to page boundaries. Advantageously, the host unit 222 determines the intermediate source virtual memory addresses and the intermediate destination virtual memory addresses associated with each of the chunk copies. In addition, the host unit 222 determines the source and destination pages associated with the chuck copies. For example, suppose that the page size and the chunk size were both 4 KB, and the source virtual memory address associated with the chunk was offset from the page boundary by 1 KB. The host unit 222 would determine that two source pages were associated with the chunk.

As previously disclosed herein, before transmitting the chunk copy cmds 330 to the copy engine 212, the host unit 222 ensures that the PPU 202 supports the appropriate virtual memory address to physical memory address translations. More specifically, the host unit 222 ensures that the PPU page table 208 includes mappings between the virtual memory addresses and physical memory addresses for all of the chunk copy cmds 330 associated with the block copy cmd 310. In addition, the host unit 222 ensures that these mappings specify the appropriate permissions. For instance, for each source page associated with the block copy cmd 310, the host unit 222 ensures that the corresponding mapping included in the PPU page table includes an activated read access bit. Similarly, for each destination page associated with the block copy cmd 310, the host unit 223 ensures that the corresponding mapping included in the PPU page table 208 includes an activated write access bit. The read and write access bits may be implemented in any technically feasible fashion with any polarity. For instance, in some embodiments, the page table entries included in the PPU page tables 208 may include a read disable bit and a write disable bit.

In operation, to ensure that the PPU MMU 213 includes the appropriate mappings, the host unit 222 preemptively issues one or more probes 320 to the PPU MMU 213. Together, these probes 320 test the validity of the memory accesses associated with the block copy cmd 310. In particular, each probe 320 is a specific transaction that tests whether the PPU MMU 213 supports a translation from the PPU page table 208 for the virtual memory address associated with the probe 320. If the PPU MMU 213 is able to translate the virtual memory address associated with the probe 320, then the PPU MMU 213 acknowledges the probe 320 with a successful probe acknowledgement (ack) 325. If the PPU MMU 213 is unable to translate the virtual memory address associated with the probe 320, then the PPU MMU 213 generates a page fault. The page fault includes information associated with the probe, such as the identity of the unit that requested the probe (i.e., the host unit 222) and the virtual memory address associated with the probe. As outlined previously herein, when the PPU MMU 213 generates a page fault, the UVM system 200 executes a page fault sequence to remedy the page fault and make the requested data available to the PPU 202. In particular, in remedying the page fault, the UVM system 200 ensures that the page associated with the page fault is resident in accessible physical memory and the PPU page table 208 support the virtual memory address translation associated with the probe 320.

Before the host unit 222 issues the chunk copy cmds 330 associated with the block copy cmd 310, the host unit 222 ensures that all of the probes 320 associated with the block copy cmd 310 are successfully acknowledged. For example, suppose that the host unit 222 were to split the block copy cmd 310 into four chunk copy cmds 330. In such a scenario, the host unit 222 would issue probes 320 to test the validity of the virtual memory address accesses of the source pages and the destination pages associated with all four of the chunk copy cmds 330. Notably, if the host unit 222 does not receive a successful probe ack 325 for any of the probes 320 associated with the block copy cmd 310, then the host unit 222 stops processing the block copy cmd 310 until the UVM system 200 remedies the page fault. Further, until the UVM system 200 remedies the page fault, other commands may be sent to the copy engine 212, and these commands may also utilize probes 320. After the UVM system 200 remedies the page fault, the host unit 222 restarts the probing process associated with the block copy cmd 310 from the beginning. More specifically, the host unit 222 reissues each of the particular probes 320 associated with the block copy cmd 310 regardless of whether the particular probe 320 was previously successful. In this manner, the host unit 222 detects any changes, such as a page swap, that invalidate the mapping associated with a previously successful probe 320. The UVM system 200 may communicate with the host unit 222 regarding the status of the page fault in any technically feasible fashion, such as by issuing an interrupt.

After the host unit 222 receives consecutive successful probe acks 325 for all of the probes 320 associated with the block copy cmd 310, the host unit 222 transmits the chunk copy cmds 330 associated with the block copy cmd to the copy engine 212. It is possible that memory management software executing on the CPU 102 may schedule swapping or remapping operations on a page that is the target of the block copy cmd 310. In such a scenario, the CPU 102 must update the PPU page table 208 prior to removing or remapping the page. As long as the process used to make the requite page table update is scheduled on the same run-list (i.e., list of processes scheduled to run on the PPU 202) as the process scheduled to do the block copy, there is a guarantee that the probes 320 and block copy are effectively atomic. More specifically, the target address cannot be removed in the shadow of the probes 320 but before the start of the copy. Advantageously, since the host unit 222 has preemptively ensured that the PPU page table 208 supports the translation of the virtual memory addresses associated with the block copy cmd 310, the copy engine 212 does not encounter page faults. Consequently, the host unit 222 enables the copy engine 212 to support demand paging. In addition, by prescreening operations to be executed by the copy engine 212, the host unit 222 enables the copy engine 212 to successfully perform operations associated with memory migration via virtual memory addresses. By contrast, in prior-art system, the copy engine 212 could encounter a page fault during memory migration via virtual memory addresses, stall, and be unavailable to remedy the page fault. In alternate embodiments the host unit 222 may be configured to support any type of command issued to any engine that does not independently tolerate page faults. For instance, in one embodiment, the host unit 222 supports a copy command for execution by a direct memory access (DMA) engine.

Further, the copy engine 212 may reduce the memory bandwidth usage associated with I/O operations between the system memory 104 and the PPU memory 204. For instance, many processing sequences include copying data from an I/O device to the PPU memory 204, operating on the data, and then copying the data back to the system memory 104. In a typical prior-art system, the software application copies the data to a user buffer included in the system memory. To ensure that the data is not corrupted by page swaps during the copy process, the prior-art system copies the data to a "pinned" buffer in the system memory (a first read from the system memory and a first write to the system memory). Subsequently, the prior-art system copies the data from the pinned buffer in the system memory to the PPU memory (a second read from the system memory). After the PPU processes the data, the prior-art system copies the data from the PPU memory to another pinned buffer in the system memory (a second write to the system memory). Finally, the prior-art system copies the data from the pinned buffer in the system memory to another user buffer (a third read from the system memory and a third write to the system memory). Thus, the processing sequence involves three reads from the system memory and three writes to the system memory.

By contrast, in the UVM system 200, the host unit 222 ensures that the appropriate data is accessible by the copy engine 212 before each copy command. Consequently, the host unit 222 preserves the integrity of the data without using pinned buffers. In the UVM system 200, to execute the processing sequence described above, the software application copies the data to a user buffer included in the system memory 104. The host unit 222 directs the copy of the data from the user buffer to the PPU memory 204 (a first read from the system memory 104). After the PPU 202 processes the data, the host unit 222 directs the copy of the data from the PPU memory 204 to another user buffer in the system memory 104 (a first write to the system memory 104). Thus, the processing sequence involves one read from the system memory 104 and one write to the system memory 104. Advantageously, in executing the processing sequence, the system memory bandwidth used by the UVM system 200 is one third the system memory bandwidth used by the prior-art system.

Figure 4:
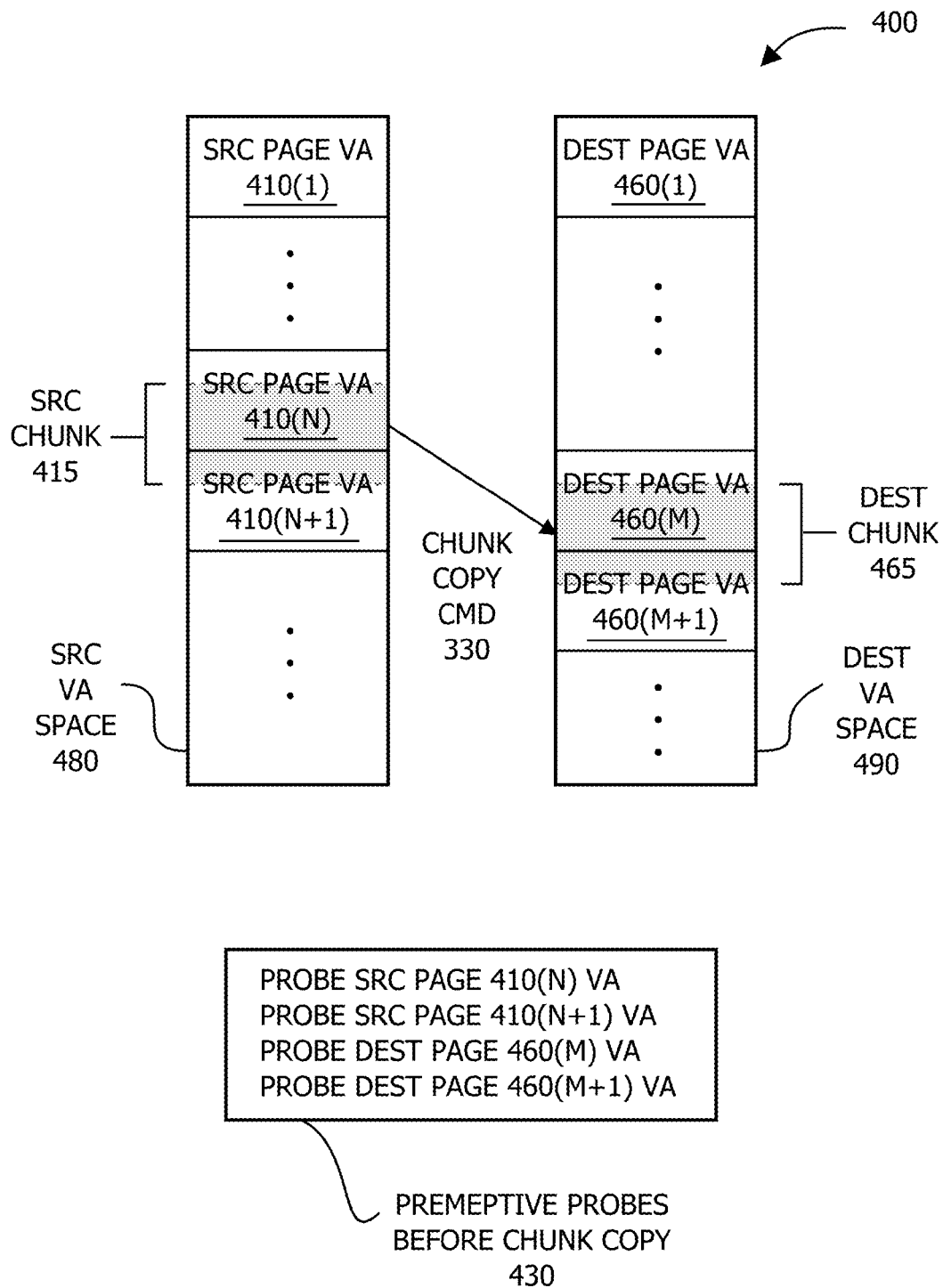
FIG. 4 is a conceptual diagram illustrating the chunk copy of FIG. 2 and associated preemptive probes, according to one embodiment of the present invention.

FIG. 4 is a conceptual diagram illustrating the chunk copy command 330 of FIG. 3 and associated preemptive probes 320, according to one embodiment of the present invention. As shown, a source virtual address space (src VA space) 480 includes multiple src pages VAs 410. In particular, the src VA space 480 includes the src page VA 410(N) and the adjacent source page VA 410(N+1). Similarly, a destination virtual address space (dest VA space) 490 include multiple dest page VAs 460. As shown, the dest VA space 490 includes the dest page VA 460(M) and the adjacent dest page VA 460(M+1). In many cases, the src VA space 480 and the dest VA space 490 are the same virtual address space, however, different engines operating on the same virtual address space may have different page tables with different pages mapped and differing permissions for the same page.

For explanatory purposes only, the context of FIG. 4 is that the chunk copy command 330 is the only chunk copy command 330 that is associated with the block copy command 310. Further, the PPU page table 208 supports the translation of the src page VA 410(N), the src page VA 410(N+1), and the dest page VA 460(M). However, the PPU page table 208 does not support the translation of the dest page VA 460(M+1).

The chunk copy cmd 330, when executed by the copy engine 212, causes a src chunk 415 to be copied to a dest chunk 465. As shown, the src chunk 415 partially overlaps both the src page VA 410(N) and the src page VA 410(N+1). Similarly, the corresponding dest chunk 465 partially overlaps both the dest page VA 410(M) and the dest page VA 460(M+1).

Before the host unit 222 transmits the chunk copy cmd 330 to the copy engine 212, the host unit 222 transmits preemptive probes before chunk copy 430 to the PPU MMU 213. As shown, the preemptive probes before chunk copy 430 includes four probes 320. The first probe 320 tests the src page VA 410(N) to ensure that the PPU 202 has read access to corresponding physical memory. The second probe 320 tests the src page VA 410(N+1) to ensure that the PPU 202 has read access to corresponding physical memory. The third probe 320 tests the dest page VA 460(M) to ensure that the PPU 202 has write access to corresponding physical memory. Finally, the fourth probe 320 tests the dest page VA 460(M+1) to ensure that the PPU 202 has write access to corresponding physical memory.

In response to the preemptive probes before chunk copy 430, the PPU MMU 213 transmits three successful probe acks 325 to the host unit 222—corresponding to the first three probes 320. However, because the PPU page table 208 does not support the translation of the dest page VA 460 (M+1), the PPU MMU 213 does not transmit a fourth successful probe ack 325 to the host unit 222. Instead, the PPU MMU 213 issues a page fault associated with the dest page VA 460(M+1) and the host unit 222. The UVM system 200 resolves the page fault, altering the PPU page table 208 to provide an appropriate mapping from the dest page VA 460(M+1) to a physical memory address. Subsequently, the host unit 222 retransmits all four of the preemptive probes before chunk copy 430. In response, the PPU MMU 213 transmits a series of four successful probe acks 325 to the host unit 222. The host unit 222 then issues the chunk copy cmd 330 to the copy engine 212. In alternate embodiments, if there were multiple chunk copy cmds associated with the block copy cmd, then the host unit would not issue any chunk copy cmds to the copy engine until receiving successful probe acks for all of the probes associated with all of the chuck copy cmds.

Figure 5:
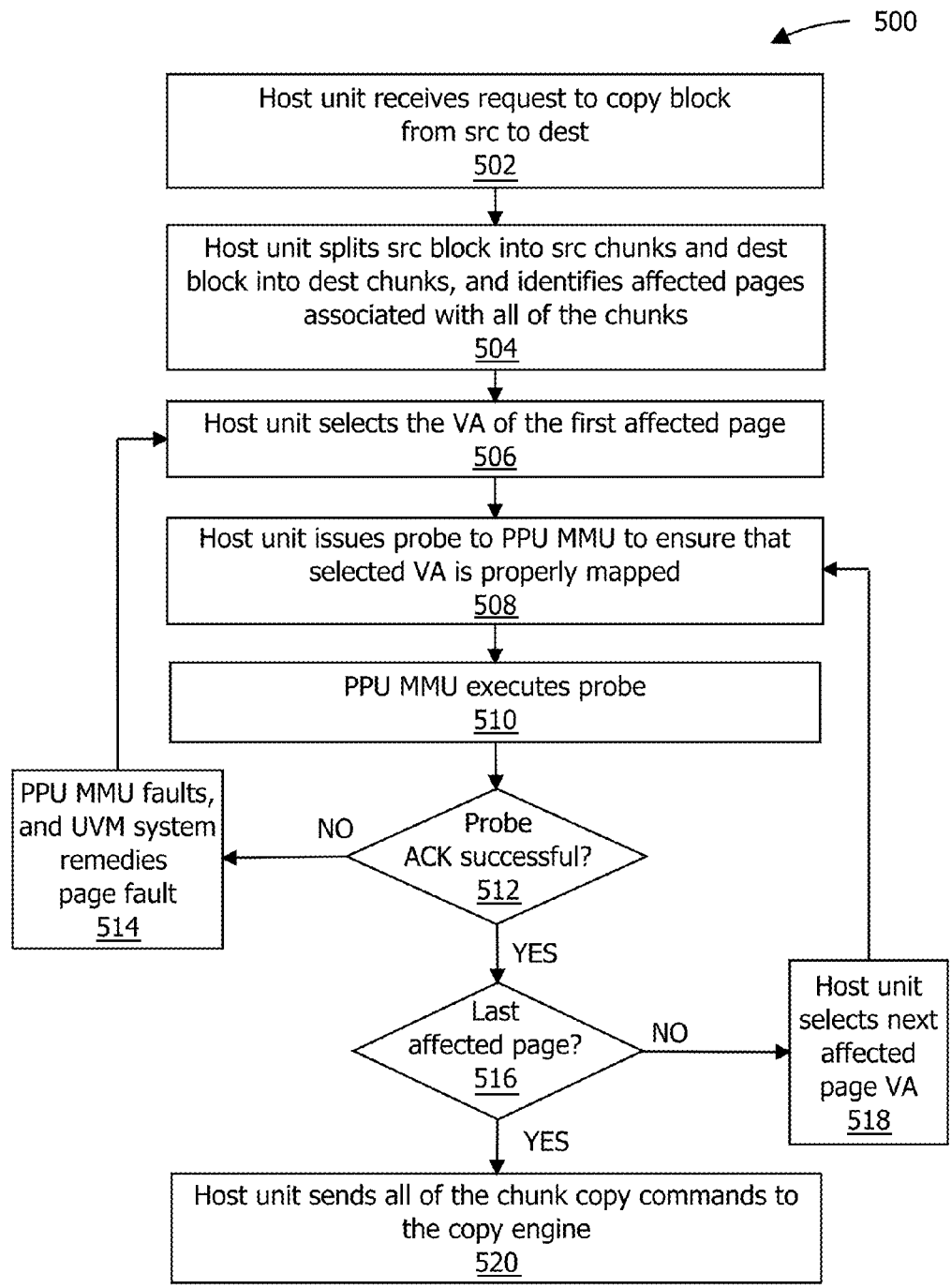
FIG. 5 is a flow diagram of method steps for processing copy commands, according to one embodiment of the present invention.

FIG. 5 is a flow diagram of method steps for processing copy commands, according to one embodiment of the present invention. Although the method steps are described herein in conjunction with the systems of FIGS. 1-4, persons skilled in the art will understand that any system configured to implement the method steps, in any order, falls within the scope of the present invention.

As shown, a method 500 begins at step 502, where the host unit 222 receives the block copy cmd 310 to copy a block from a source memory virtual address to a destination memory virtual address. For instance, the block copy cmd 310 may request that the host unit 222 copy a 256 MB block from a virtual address associated with the system memory 104 to a virtual address associated with the PPU memory 204. Notably, the block copy cmd 310 includes virtual memory addresses that specify the source memory location and the destination memory location. At step 504, the host unit 222 splits the source block into smaller source chunks, and the corresponding destination block into smaller destination chunks. As part of step 504, the host unit 222 determines the pages that are either partially or fully overlapped by the source chunks or the destination chunks—the affected pages. Together, the affected pages represent all of the pages that are associated with the block copy cmd 310.

At step 506, the host unit 222 selects the virtual memory address associated with the first affected page. At step 508, the host unit 222 issues a particular probe 320 associated with the selected virtual memory address to the PPU MMU 213. The particular probe 320 tests the validity of the appropriate memory access via the selected virtual memory address. Notably, if the selected virtual address is associated with a destination chunk, then the particular probe 320 tests that the PPU 202 may write to the destination memory via the virtual address. At step 510, the PPU MMU 213 executes the probe 320. If, at step 512, the PPU MMU 213 does not issue a successful probe acknowledgement 325, then the method 500 proceeds to step 514 where the PPU MMU 213 issues a page fault. As part of step 514, the UVM system 200 remedies the page fault and the method 500 returns to step 506. The host unit 222 cycles through steps 506-514, restarting the probing process from the first affected page until the host unit 222 receives successful probe acknowledgements 325 for the selected virtual memory address.

At step 512, if the PPU MMU 213 issues a successful probe acknowledgement 325, then the method 500 proceeds to step 516. If, at step 516, the host unit 222 determines that the selected virtual memory address is not associated with the last affected page, then the method 500 proceeds to step 518. At step 518, the host unit 222 selects the virtual memory address associated with the next affected page, and the method 500 returns to step 508. The host unit 222 cycles through steps 508-518, issuing probes 320 for the virtual memory addresses associated with the affected pages until the host unit 222 receives successful probe acknowledgements 325 for all of the virtual memory addresses. At step 516, if the host unit 222 determines that the selected virtual memory address is associated with the last affected page, then the method 500 proceeds to step 520. Again, the affected pages include all the pages that are overlapped by any of the source chunk or the dest chunks associated with the block copy cmd 310. At step 520, the host unit 222 issues chunk copy cmds 330 associated with the block copy cmd 310 to the copy engine 212. Together, the chunk copy cmds 330 cause the copy engine 212 to copy the block from the source physical memory to the destination physical memory. In an alternate embodiment, the host unit 222 sends the chunk copy command 330 to the copy engine 212 as the probes 320 for the chunk are successful, thereby interleaving the probes 320 with chunk copies in a pipelined fashion.

In sum, using probes to test virtual memory address mappings enables demand paging by units within the PPU that cannot effectively stall in the presence of page faults. In one instance, a host unit included in the PPU ensures that the PPU is configured to support the appropriate virtual memory address to physical memory translations before issuing commands to a copy engine. Upon receiving a request to copy a block from a source memory to a destination memory, the host unit splits the block into source chunks. For each source chunk, the host identifies the source pages that that the source chunk partially or fully overlaps. Similarly, the host identifies the destination pages that the corresponding destination chunk partially or fully overlaps. Together, the pages overlapped by the chunks represent the pages that are affected by the block copy command.

The host unit then issues preemptive probes to the PPU MMU. These probes test the validity of the memory accesses associated with the pages affected by the block copy command. If any of the preemptive probes are not successfully acknowledged by the MMU, then the PPU MMU issues a page fault and the UVM system remedies the page fault. After the page fault is remedied, the host unit reissues all of the preemptive probes to the PPU MMU. Finally, if all of the preemptive probes are successfully acknowledged by the PPU MMU, then the host unit sends commands to the copy engine that cause the copy engine to copy each source chunk to the corresponding destination chunk. Together, these chunk copy commands cause the copy engine to copy the source block to the destination block.

Advantageously, the techniques disclosed herein ensure that a process is able to access data via a virtual address before the process is allowed to request the data. Thus, regardless of whether the page table associated with a PPU included in a unified virtual memory architecture includes an appropriate mapping for the virtual address before the process requests the data, the disclosed techniques ensure that no page fault occurs. Moreover, the techniques disclosed herein enable units to support demand paging without stalling. Consequently, these techniques facilitate demand paging in units that are involved in remedying page faults. By contrast, in prior-art techniques, demand paging is restricted to units that are not involved in remedying page fault. Further, since the techniques disclosed herein ensure that virtual addresses are appropriately mapped before executing commands, these techniques enable I/O operations to transfer data directly between un-pinned user buffers included in the system memory and the PPU memory. Advantageously, directly transferring data between system memory and PPU memory reduces system bandwidth usage compared to prior-art techniques that employ pinned buffers for I/O operations.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A computer-implemented method for supporting demand paging, the method comprising:
   receiving one or more requests for a copy engine within a processing subsystem to perform one or more operations, wherein the one or more requests comprise one or more virtual memory addresses that correspond to the one or more operations;
   prior to transmitting any request included in the one or more requests to the copy engine, ensuring that the processing subsystem includes a memory mapping for each of the one or more virtual memory addresses; and
   transmitting the one or more requests to the copy engine for processing.

2. The method of claim 1, wherein ensuring that the processing subsystem includes a memory mapping for one or more virtual memory addresses comprises ensuring that the processing subsystem includes a memory mapping for a first virtual memory address by transmitting a first probe associated with the first virtual memory address to a memory management unit, and receiving a response to the first probe.

3. The method of claim 2, wherein transmitting the first probe comprises updating a run-list of processes scheduled to run on the processing subsystem to include a command to transmit the first probe to the memory management unit, wherein the run-list reflects one or more processes that perform at least one update to the memory mapping.

4. The method of claim 3, wherein ensuring that the processing subsystem includes the memory mapping for the first virtual memory further comprises determining that an update to the memory mapping is scheduled to occur subsequent to the transmission of the first probe, retransmitting the first probe to the memory management unit, and receiving a second response to the first probe.

5. The method of claim 2, wherein receiving a response to the first probe comprises receiving a first acknowledgement indicating that the processing subsystem includes the memory mapping for the first virtual memory address.

6. The method of claim 5, wherein ensuring that the processing subsystem includes a memory mapping for a second virtual memory address included in the one or more virtual memory addresses comprises:
   transmitting a second probe associated with the second virtual memory address to the memory management unit;
   determining that a page fault associated with the second probe has been resolved;
   retransmitting the first probe to the memory management unit;
   receiving a second acknowledgement indicating that the processing subsystem includes the memory mapping for the first virtual memory address;
   retransmitting the second probe to the memory management unit; and
   receiving a third acknowledgement indicating that the processing subsystem includes the memory mapping for the second virtual memory address.

7. The method of claim 6, wherein the memory management unit generates the page fault based on the second probe.

8. The method of claim 1, wherein ensuring that the processing subsystem includes a memory mapping for a first virtual address included in the one or more virtual memory addresses comprises:
   transmitting a first probe associated with the first virtual memory address to a memory management unit;
   determining that a page fault associated with the first probe has been resolved;
   retransmitting the first probe to the memory management unit; and
   receiving an acknowledgement indicating that the processing subsystem includes the memory mapping for the first virtual memory address.

9. The method of claim 8, wherein the memory management unit generates the page fault based on the first probe.

10. The method of claim 9, wherein determining that the page fault is resolved comprises receiving an interrupt.

11. The method of claim 1, wherein the operation comprises a write operation to a first virtual memory address included in the one or more virtual memory addresses, and ensuring that the processing subsystem includes a memory mapping for the first virtual memory address comprises:
    transmitting a probe associated with the write operation to a memory management unit; and
    receiving a response to the probe indicating that the processing subsystem includes the memory mapping for the first virtual address and that the memory mapping for the first virtual address includes an activated write enable bit.

12. A subsystem to support demand paging, the subsystem comprising:
    a memory that includes a page table;
    a memory management unit coupled to the memory, wherein the memory management unit:

processes requests for translating virtual memory addresses to physical memory addresses, and manages the page table;

a copy engine coupled to the memory management unit, wherein the copy engine performs operations associated with virtual memory addresses; and a host coupled to the copy engine and to the memory management unit, wherein the host:

receives one or more requests for the copy engine to perform one or more operations, wherein the one or more requests comprise one or more virtual memory addresses that correspond to the one or more operations;

prior to transmitting any request included in the one or more requests to the copy engine, ensures that the page table includes a memory mapping for each of the one or more virtual memory addresses; and transmits the one or more requests to the copy engine for processing.

13. The subsystem of claim 12, wherein ensuring that the page table includes a memory mapping for a first virtual memory address included in the one or more virtual memory addresses comprises transmitting a first probe associated with the first virtual memory address to the memory management unit, and receiving a response to the first probe.

14. The subsystem of claim 13, wherein receiving a response to the first probe comprises receiving a first acknowledgement indicating that the page table includes the memory mapping for the first virtual memory address.

15. The subsystem of claim 14, wherein ensuring that the page table includes a memory mapping for a second virtual memory address included in the one or more virtual memory addresses comprises:

transmitting a second probe associated with the second virtual memory address to the memory management unit;

determining that a page fault associated with the second probe has been resolved;

retransmitting the first probe to the memory management unit;

receiving a second acknowledgement indicating that the page table includes the memory mapping for the first virtual memory address;

retransmitting the second probe to the memory management unit; and receiving a third acknowledgement indicating that the page table includes the memory mapping for the second virtual memory address.

16. The subsystem of claim 15, wherein the memory management unit generates the page fault based on the second probe.

17. The subsystem of claim 12, wherein ensuring that the page table includes a memory mapping for a first virtual address included in the one or more virtual memory addresses comprises:

transmitting a first probe associated with the first virtual memory address to the memory management unit;

determining that a page fault associated with the first probe has been resolved;

retransmitting the first probe to the memory management unit; and receiving an acknowledgement indicating that the page table includes the memory mapping for the first virtual memory address.

18. The subsystem of claim 17, wherein the memory management unit generates the page fault based on the first probe.

19. The subsystem of claim 18, wherein determining that the page fault is resolved comprises receiving an interrupt.

20. The subsystem of claim 12, wherein the operation comprises a write operation to a first virtual memory address included in the one or more virtual memory addresses, and ensuring that the page table includes a memory mapping for the first virtual memory address comprises:

transmitting a probe associated with the write operation to the memory management unit; and receiving a response to the probe indicating that the page table includes the memory mapping for the first virtual address and that the memory mapping for the first virtual address includes an activated write enable bit.

21. A computing device, comprising:

a memory that includes a page table;

a memory management unit that:

processes requests for translating virtual memory addresses to physical memory addresses, and manages the page table;

a copy engine that performs operations associated with virtual memory addresses; and a host that:

receives one or more requests for the copy engine to perform one or more operations, wherein the one or more requests associated with comprise one or more virtual memory addresses that correspond to the one or more operations;

prior to transmitting any request included in the one or more requests to the copy engine, ensures that the page table includes a memory mapping for each of the one or more virtual memory addresses; and transmits the one or more requests to the copy engine for processing.

22. The computing device of claim 21, wherein ensuring that the page table includes a memory mapping for a first virtual address included in the one or more virtual memory addresses comprises:

transmitting a first probe associated with the first virtual memory address to the memory management unit;

determining that a page fault associated with the first probe has been resolved;

retransmitting the first probe to the memory management unit; and receiving an acknowledgement indicating that the page table includes the memory mapping for the first virtual memory address.

23. The method of claim 1, wherein the copy engine comprises an engine unable to service a page fault caused by an absence of the memory mapping in the processing subsystem.

24. The method of claim 1, further comprising ensuring that no request is transmitted to the copy engine prior to ensuring that the processing subsystem includes a memory mapping for each virtual memory address associated with the one or more requests.

25. The subsystem of claim 12, wherein ensuring that the page table includes a memory mapping for each of the one or more virtual memory addresses comprises issuing a probe associated with the one or more virtual memory addresses to the memory management unit to test whether the memory management unit supports a translation for the one or more virtual memory addresses.

26. The method of claim 1, wherein ensuring that the processing subsystem includes a memory mapping for each of the one or more virtual memory addresses is performed via a host coupled to the copy engine.

\* \* \* \* \*

UNITED STATES PATENT AND TRADEMARK OFFICE
CERTIFICATE OF CORRECTION

| | | |
|---|---|---|
| PATENT NO. | : 10,114,758 B2 | Page 1 of 1 |
| APPLICATION NO. | : 14/026806 | |
| DATED | : October 30, 2018 | |
| INVENTOR(S) | : Samuel H. Duncan et al. | |

It is certified that error appears in the above-identified patent and that said Letters Patent is hereby corrected as shown below:

In the Claims

Column 26, Claim 21, Line 26, please delete "associated with" before comprise.

Signed and Sealed this
Eighth Day of January, 2019

Andrei Iancu
*Director of the United States Patent and Trademark Office*